(12) United States Patent
Reiff

(10) Patent No.: US 8,183,708 B2
(45) Date of Patent: May 22, 2012

(54) OPEN OCEAN WAVE ENERGY CONVERTER WITH ISOLATED STABILIZATION FLOATS

(76) Inventor: Carl Stanley Reiff, Loomis, CA (US)

( * ) Notice: Subject to any disclaimer, the term of this patent is extended or adjusted under 35 U.S.C. 154(b) by 324 days.

(21) Appl. No.: 12/387,006

(22) Filed: Apr. 25, 2009

(65) Prior Publication Data

US 2010/0019497 A1    Jan. 28, 2010

Related U.S. Application Data

(60) Provisional application No. 61/135,914, filed on Jul. 25, 2008.

(51) Int. Cl.
| F03B 13/16 | (2006.01) |
| F03B 13/10 | (2006.01) |
| F03B 13/12 | (2006.01) |
| F03B 13/14 | (2006.01) |

(52) U.S. Cl. ............................................ 290/53; 290/42

(58) Field of Classification Search ................... 290/53, 290/42
See application file for complete search history.

(56) References Cited

U.S. PATENT DOCUMENTS

| 4,145,885 | A | * | 3/1979 | Solell | ............... | 290/53 |
| 4,389,843 | A | * | 6/1983 | Lamberti | ........................ | 290/42 |
| 4,392,060 | A | * | 7/1983 | Ivy | ............... | 290/53 |
| 7,315,092 | B2 | * | 1/2008 | Cook | ............... | 290/53 |
| 2003/0121255 | A1 | * | 7/2003 | Dick | ............... | 60/398 |
| 2008/0284173 | A1 | * | 11/2008 | Stansby et al. | ................. | 290/53 |

FOREIGN PATENT DOCUMENTS

WO    WO 2006031121 A1 *    3/2006

* cited by examiner

Primary Examiner — Quyen Leung
Assistant Examiner — Michael Andrews

(57) ABSTRACT

The apparatus defined herein comprises a platform, isolated stabilization floats, bobbing floats, and linear drive converters, in order to transform the energy represented by the bobbing motion of ocean waves/swells into a rotating mechanical motion.

10 Claims, 14 Drawing Sheets

OPEN OCEAN WAVE ENERGY CONVERTER WITH ISOLATED STABILIZATION FLOATS

CROSS REFERENCE TO RELATED APPLICATIONS

This application claims the benefit of U.S. Provisional Patent Application No. 61/135,914 dated Jul. 25, 2008, which is incorporated by reference.

FIELD OF THE INVENTION

The invention described herein relates to floating ocean wave energy converters.

BACKGROUND OF THE INVENTION

Many attempts have been made to devise a viable means for converting the energy contained in the bobbing waves of the open ocean to a readily usable form. However, the vast majority of those who have thus endeavored lack the necessary knowledge and understanding of the underlying, intrinsic physical properties and forces involved. The surface state of any ocean (or portion thereof) is constantly changing, and any device which cannot accommodate varying seas is simply not viable. Granted, no device will derive energy from a calm sea, but that's because there isn't any energy to derive, rather than it being a fault of the device. Another state which must be handled is that of fully developed seas. Such conditions are typically associated with hurricanes or storms with hurricane force winds. A truly viable device will not only weather hurricanes, but will operate at peak efficiency while so doing. Additionally, any designer must understand and consider factors like wave periodicity and their relation to significant wave heights, and the less common H/10s, H/100s, and rogue/freak/monster waves. The devices must not only be able to weather such events, but not be adversely affected thereby. As such, most machines, once constructed, don't perform as envisioned.

U.S. Pat. No. 7,315,092 B2 describes an interconnected three float device which similarly suffers. While the idea and design seems workable (it only requires angular movement between the floats), any given implementation only has a chance of functioning in seas with a harmonically matching wavelength. If the wavelength is too long, the entire machine will simply ride the waves as a whole, without any movement between the three floats. Similarly, if the wavelength is too short, it will basically lie flat, again without movement between the floats. Also, based on the example given in the detailed description section and reasonable approximation from the diagrams, when any (or all) of the floats are subjected to the situation where one end of a float is subjected to a rising wave and the other end is subjected to a lowering wave (trough), the machine would simply list, or even roll over on its side, rather than actuate. Waves are anything but smooth and predictable. They are completely random and erratic. When designing a device, consideration must be given to all circumstances and possibilities, not just the envisioned ideal.

Contrary to the inventor's assumption of 45 degree wave slopes, the maximum slope of undulating waves (or waves with sustained continuity—meaning that they don't break or splash), which are the most typical in the open ocean, is only 30 degrees. Even with ideal wave formations (which are extremely rare, especially continuously over any period of time), and if the three floats are properly weighted (meaning that when they are at rest in a calm body of water they are each half submerged), then if the two end floats are subjected to rising waves and the center float is subjected to a lowering wave (trough), because of the resistence of turning the generator (optimally, the machine should be tuned to match the resistance of the generator such that when two connected floats are differentially acted upon by rising and falling waves, that the generator not turn until the top of the rising float is level with the top of the rising wave [basically submerged], and the bottom of the falling float is just touching the top of the falling wave [basically out of the water]), the machine wouldn't flex at all because its proportions are such that it would require that the wave slopes be greater than the 30 degree limit placed on them by nature. Yes, a less resistant (smaller) generator could be used, but then only a modicum of energy would be converted, and the vast majority wasted. Sure, no device will be 100 percent efficient, but to be cost effective, it needs to be in the higher end of the spectrum, not the lower end.

The most important aspect of creating a machine for efficiently converting wave energy to a more usable form is to maximize and capitalize on the differential movement between two (or more) connected physical objects. While almost all inventors of wave energy converters can envision their machines working, they simply don't recognize most of the natural forces at play. Literally hundreds of patents have been granted for wave energy converters, yet only a hand full are actually being attempted anywhere in the world.

An example of a good scenario for maximizing the coveted movement differential would be to use a piling of a pier, and mechanically connect a float to it. The piling is fixed and immovable, so when a wave raises the float, the differential in movement could be exploited to its fullest. Piers are not really viable since people wouldn't want the coastlines of the world covered with them, and they're also typically in shallow water. The biggest waves are out in the open ocean, in deep water, and building piers in thousands, or even hundreds, of feet of water just isn't practical. The idea is to mimic, as much as possible, the fixed nature of piers in the open seas. The invention described herein does just that.

SUMMARY OF THE INVENTION

The machine described herein comprises a platform, isolated stabilization floats, bobbing floats, and linear drive converters. The platform is composed of a matrix of interconnected tetrahedrons with a fixed horizontal plate covering the bottom. Triangles form the most rigid skeletal shape in two dimensions, and tetrahedrons form the most rigid skeletal shape in three. This inherent rigidity will allow the platform to withstand the forces of nature. The platform is designed to be predominantly submerged (three-fourths below the mean water line) and is supported by the isolated stabilization floats. The isolated stabilization floats consist of floats (shielded from the effects/disturbances of surface waves) within vertical columns, open at each end, extending up out of the water higher than the apex of predominant waves, and extending down into the water to a depth where disturbance caused by surface waves is nil. The bobbing floats are contained in a cage structure. The top and bottom of each individual bobbing float are connected to each other via a chain which is run over sprockets, which are situated at the top and bottom of the throw. The sprockets at the top are part of the linear drive converter. The converter consists of sprockets, which are driven via the chain by the up-and-down motions of the bobbing float as it is acted upon by the rising and falling of the waves; two opposing ratchets which alternately engage based on the direction of each sprocket's rotation; and a set of interconnecting gears which provide a final, unidirectional rotating output drive which can be applied to any number of uses.

DETAILED DESCRIPTION OF THE INVENTION

Figure 1:
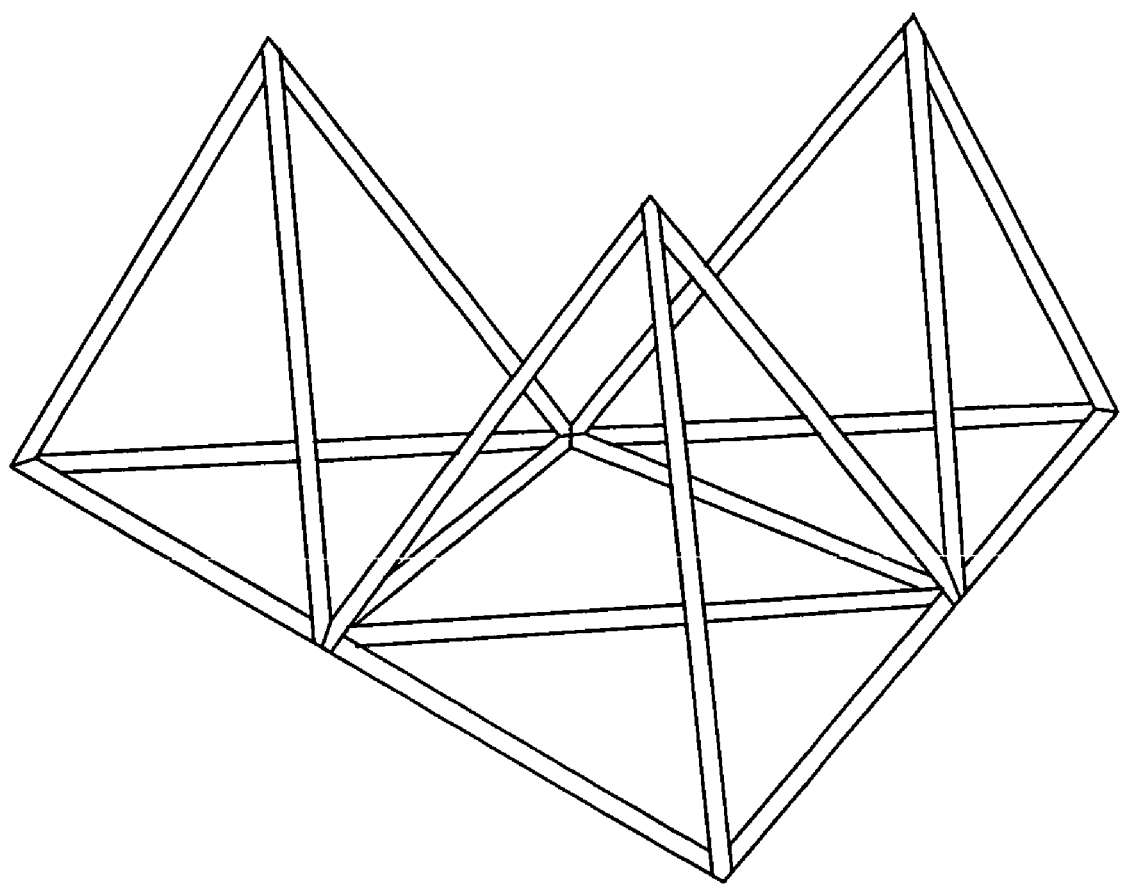
FIG. 1 shows three identical tetrahedrons (on a flat surface) joined together as described in the detailed description.
Figure 2:
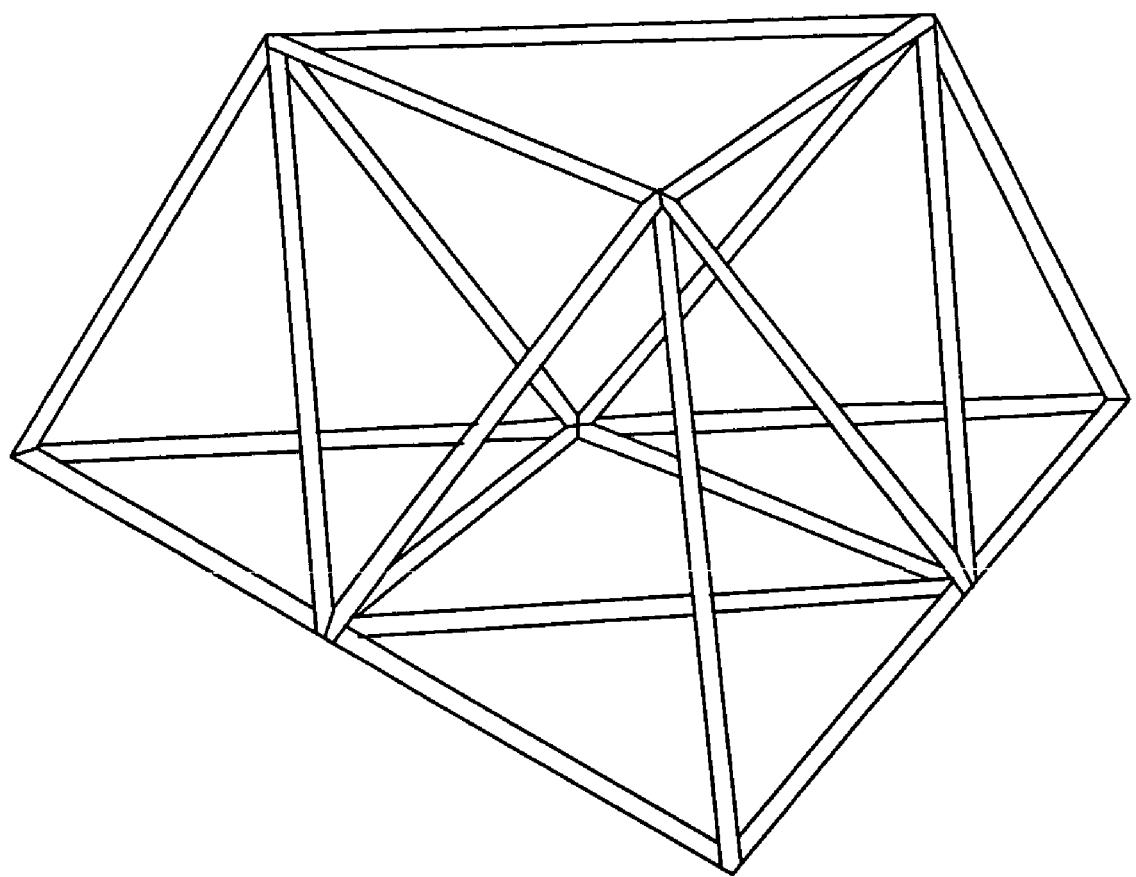
FIG. 2 shows the same three tetrahedrons (from FIG. 1) with their peaks linked—forming a layer.
Figure 3:
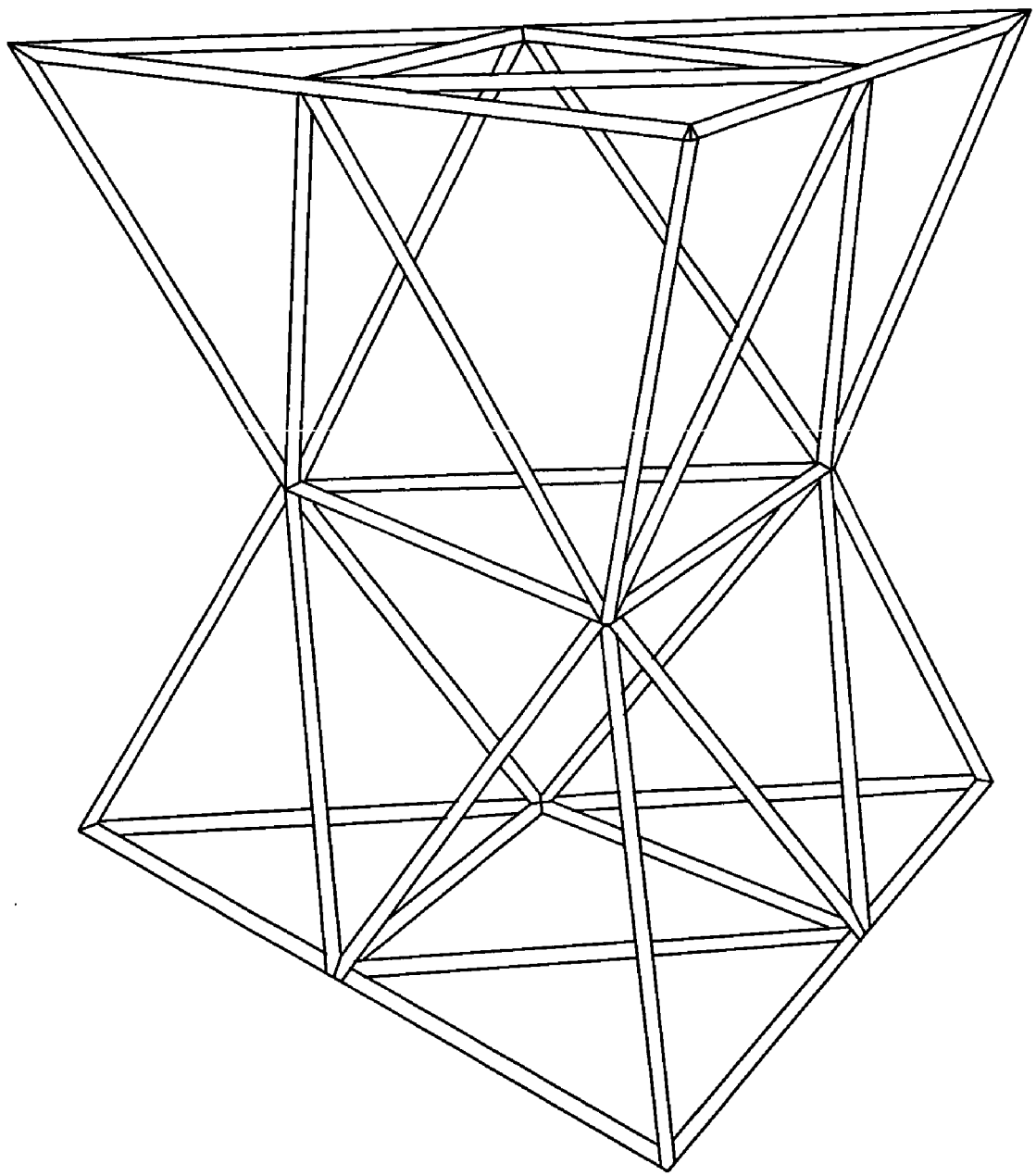
FIG. 3 is one layer, inverted, and stacked on top of another layer—forming a unit.
Figure 4:
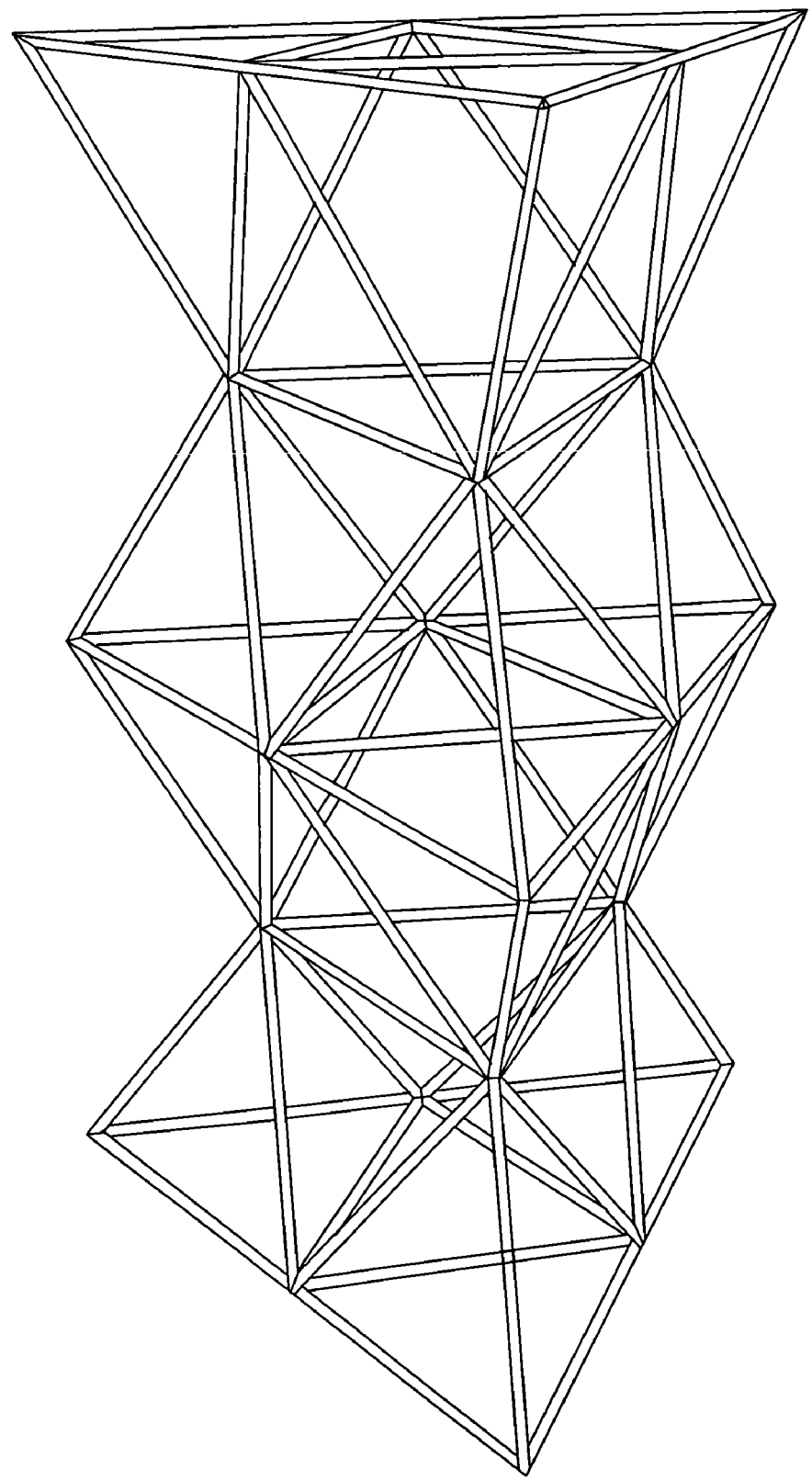
FIG. 4 is one unit stacked on top of another unit—forming a module.

The platform can be constructed (and even deployed) in a modular fashion. To construct a module, start by building three identical tetrahedrons on a flat surface, and join two of the vertices of each to one of the vertices of each of the others as shown in FIG. 1. Then connect the peaks of each to the peaks of the others as shown in FIG. 2. This represents one layer of a module. Each module consists of four layers. Repeat the process to construct three more layers. Invert one of the new layers and attach it to the top of layer one (making a unit) as shown in FIG. 3. Take the two remaining layers and similarly join them into a unit. Mount and attach one unit on top of the other as shown in FIG. 4. This is the skeletal structure of a module.

The stabilizing floats are composed of hollow vertical conduits (open at each end), extending from the top of the module down to the bottom, housing floats. The shape and composition of the floats is of little consequence. They just need to keep the module afloat. The conduits, when looking down from the top, can be virtually any shape. However, all the sides (surfaces) need to be vertical (straight from top to bottom). A cylinder (like a pipe), standing on end, would be an example of a round conduit. Because it's round, it technically only has one surface (two if the interior surface is also counted) which is vertical—perfectly straight from top to bottom. For the purposes of this embodiment a triangular shape is used. The floats, although fixed within the conduit, must have some clearance from the conduits' interior walls so as to allow vertical passage of water in case rain or sea water enters from the top.

Figure 5:
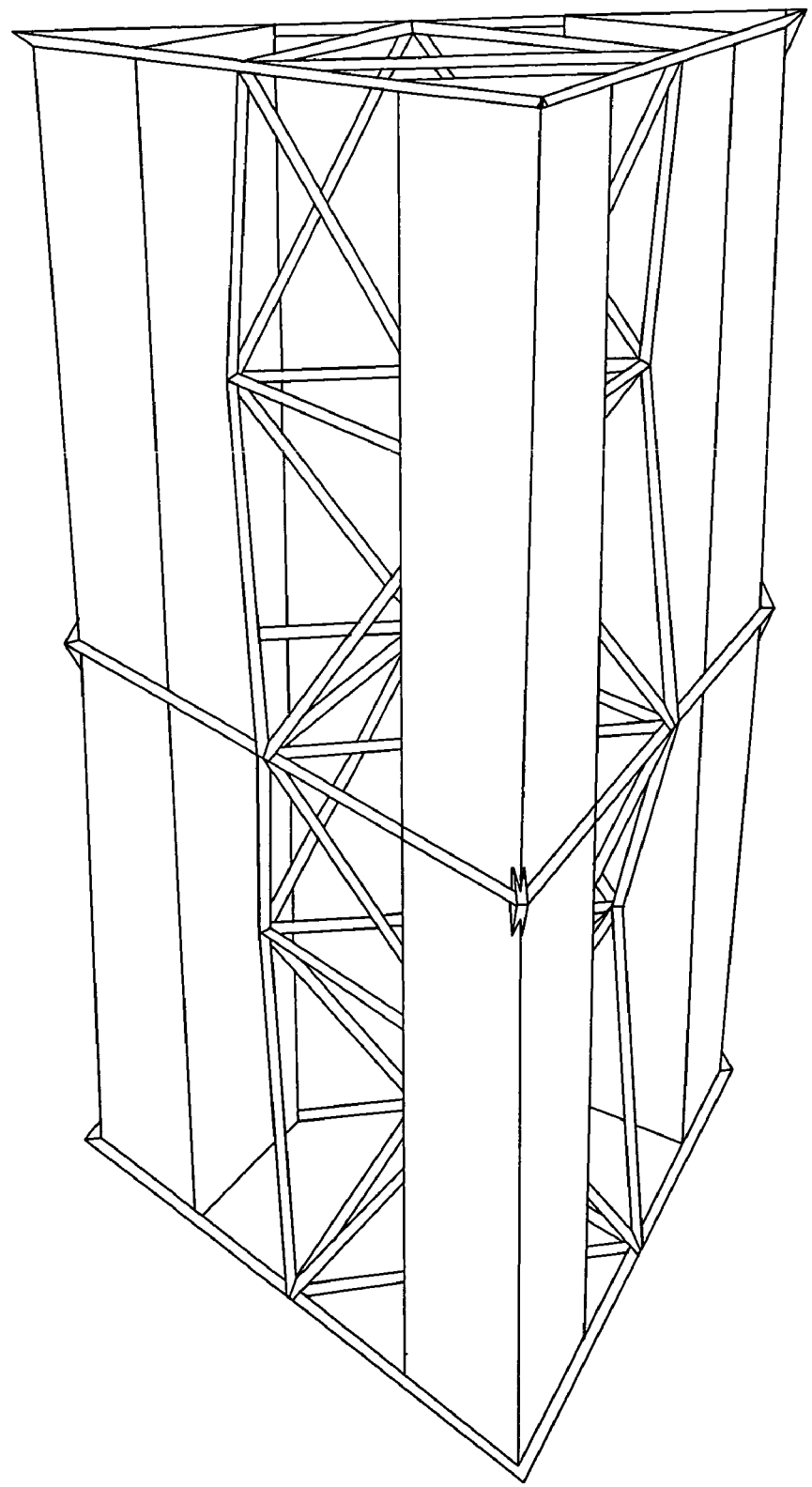
FIG. 5 is a module with the stabilization float conduits included.

The purpose of the conduits (15) is to shield their interior floats from the effects of exterior waves and swells. With all vertical surfaces, waves and swells don't have anything to push or pull against, leaving the conduits and the platform unaffected by their rise and fall, while on the interior, the stabilization floats rest in/on perfectly calm water at a constant level. Having the conduits extend down to the depth where the water is unaffected by the action of the surface waves and swells is what allows the surface water inside the conduits to be perfectly still and level. There is a mean water level which is halfway between the apogees and perigees of the surface waves and swells, which is the level inside the conduits. For this embodiment the stabilization floats are placed at the corners of the module as shown in FIG. 5. The floats (within the conduits) are situated so that the mean water line is at the mid-way point of the upper unit.

Figure 6:
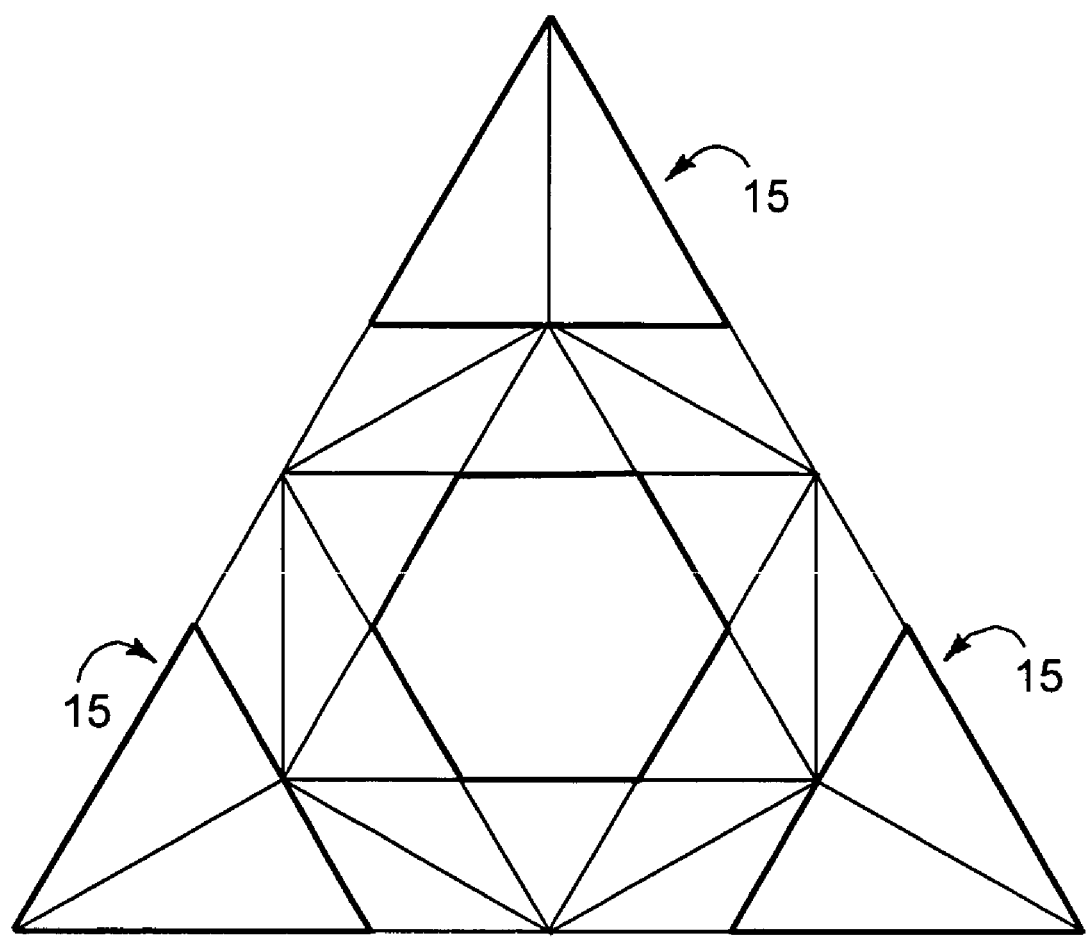
FIG. 6 is a top view of the platform module showing the three stabilization float conduits (15), and the vertical hexagonal opening extending through its center.
Figure 7:
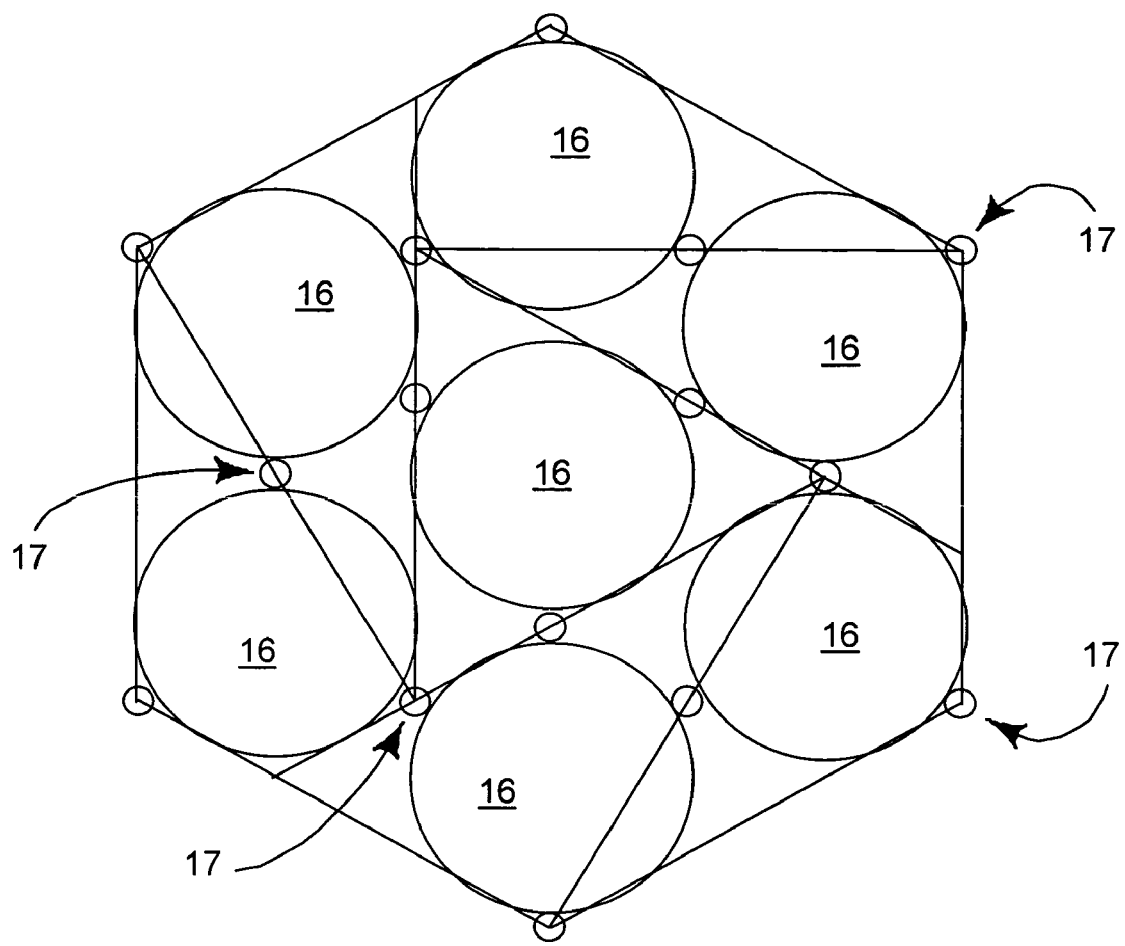
FIG. 7 is a top view of the cage structure, with its guides (17), containing the bobbing floats (16).
Figure 8:
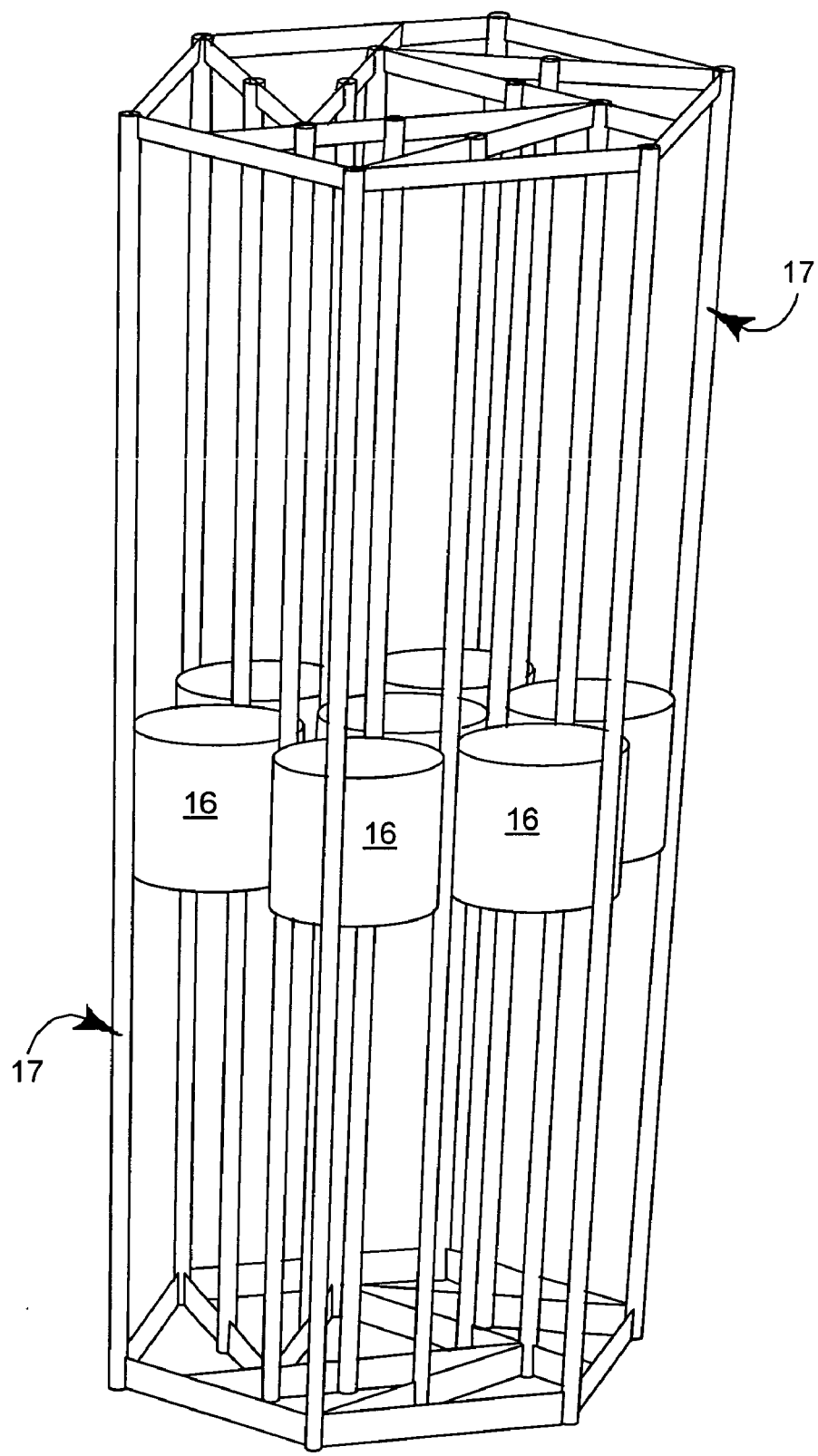
FIG. 8. is a 3-D view of the cage structure, with its guides (17), containing the bobbing floats (16).

The bobbing floats (16) are exposed and responsive to the vertical motions of the surface waves and swells. Their shape is of little consequence, as is their number. They just need to be 'half buoyant'—meaning that they are half submerged when they are at rest in still water. The reason for this is so that the force exerted on the floats when waves fall will be equal to the force exerted on them when waves rise. This allows equivalent energy to be converted on both the up and down strokes. For this embodiment the floats will be short cylinders, closed at the ends. They will be contained in a cage-like structure which will facilitate their vertical movement and prohibit non-vertical movement. When viewed from the top, as shown in the wire frame diagram in FIG. 6, the platform module has a hexagonal cavity extending through its center. The cage containing the bobbing floats is likewise hexagonal in shape and fills the cavity through the length of the upper unit. For this embodiment the cage houses seven floats and has fifteen vertical members which segregate the floats and act as guides (17), as shown in FIGS. 7 and 8. For each bobbing float, a chain is run over sprockets at each end (top and bottom) of the cage, with one end attached to the top of the float, and the other attached to the bottom. While other items such as laterally grooved (spur) belts and pulleys or cogs could also be utilized, for this embodiment chains and sprockets will be considered. As waves rise and fall, the floats cause the chains to turn the sprockets. The bottom sprockets are free spinning. The top sprockets are part of the linear drive converters.

Figure 9:
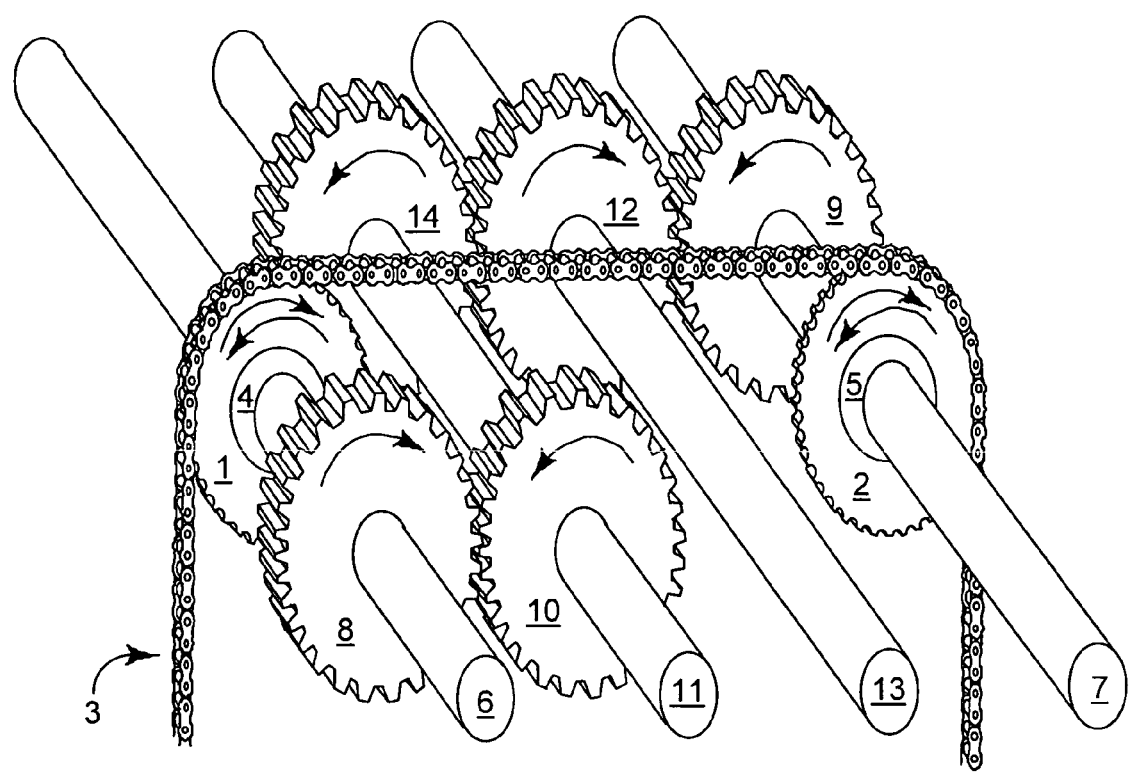
FIG. 9 is a 3-D rendering of the internal workings of the linear drive converter(s).
Figure 10:
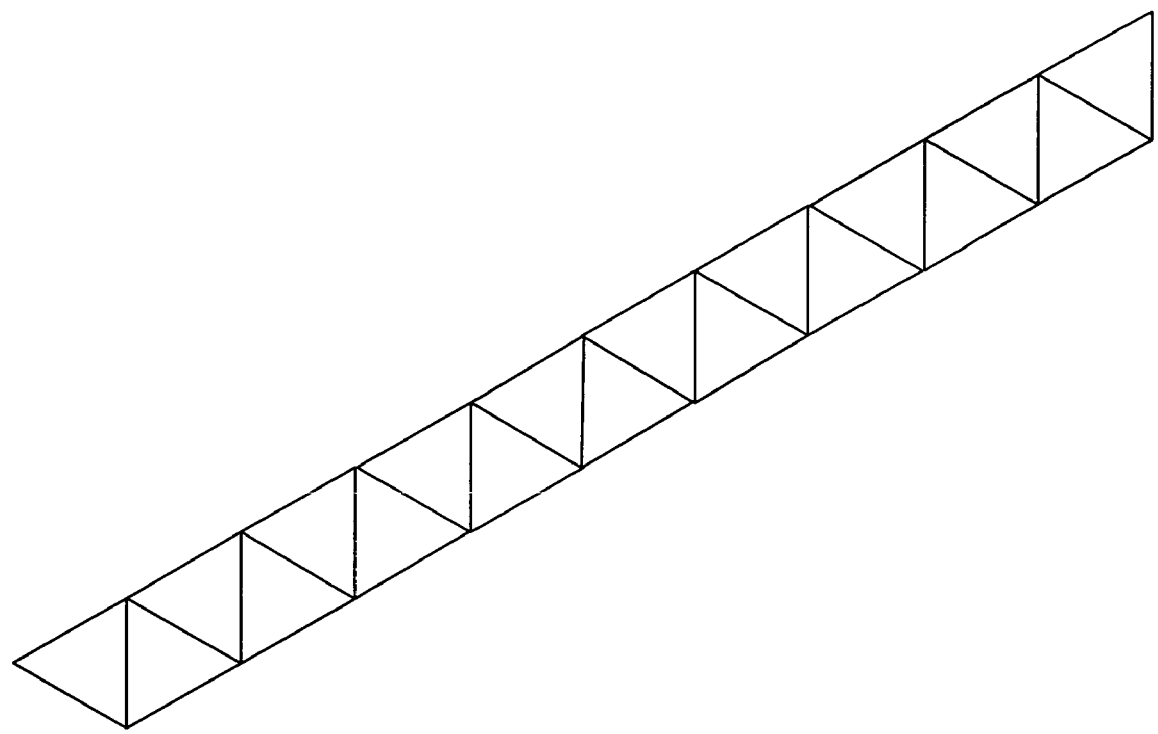
FIG. 10 is a wire frame diagram showing a top view of modules (in outline form) combined together to create a linear platform.
Figure 11:
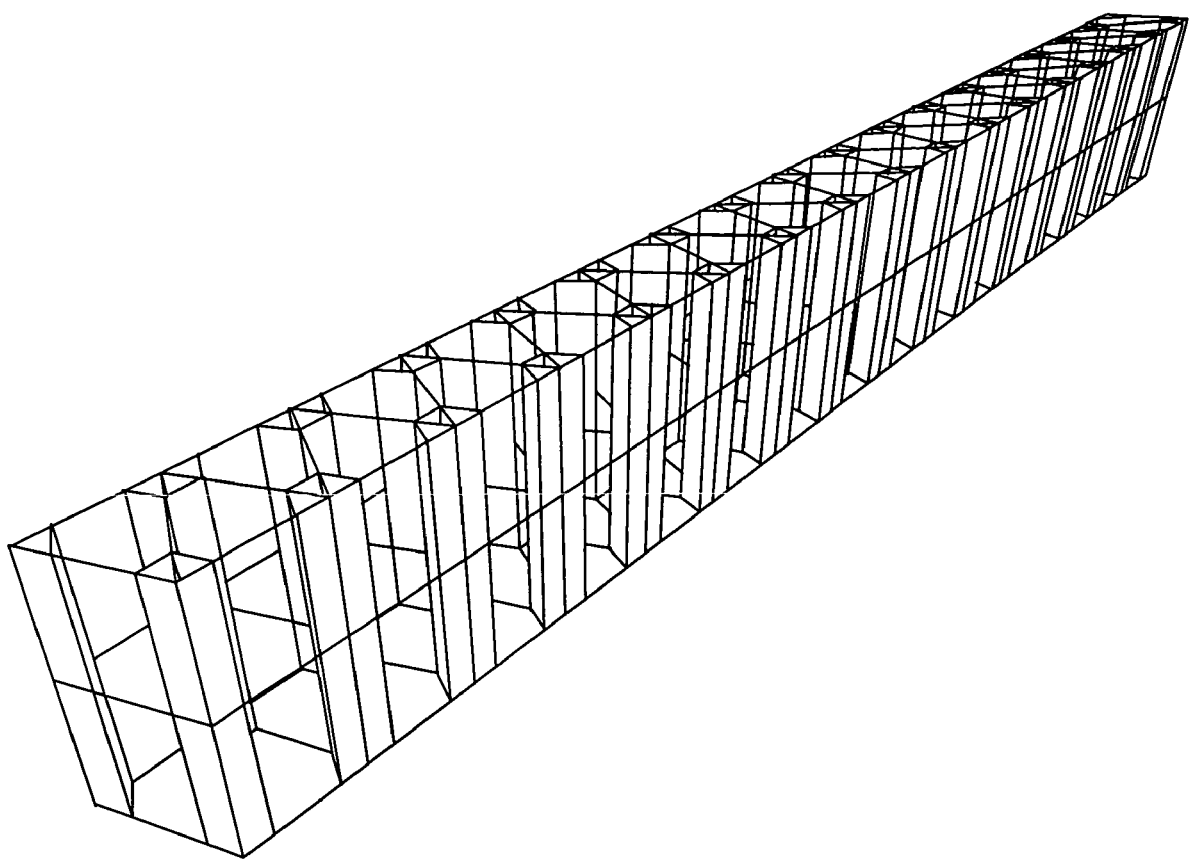
FIG. 11 is a simplified 3-D rendition of a linear platform (showing only the outline skeletal structure of the modules and their stabilization float conduits).

The linear drive converters, as shown in FIG. 9, change bi-directional, linear motion to unidirectional, rotary motion. The converters contain two opposing sprockets (1 and 2) with the chain (3) running in series over them. Each sprocket is coupled with a ratchet (4 and 5) which, in turn, is mounted on a shaft (6 and 7). Mounted on each of these shafts is a spur gear (8 and 9). When the sprocket (1) on the side leading to the top of the float rotates clockwise (i.e., when the float is rising), the ratchet (4) engages and turns the spur gear (8) in the same direction. This spur gear is meshed with another spur gear (10) on another shaft (11), which rotates in the opposite (counterclockwise) direction. During this time the other sprocket (2), on the side leading to the bottom of the float, also rotates clockwise, but its ratchet (5) disengages and spins freely in the counterclockwise direction. The ratchet is connected to a spur gear (9) via a shaft (7) which turns in lockstep with the rotation of the ratchet. The spur gear is meshed with another spur gear (12) on another shaft (13) rotating in the clockwise direction, which, in turn, is meshed with yet another spur gear (14) rotating in the counterclockwise direction, and on the same shaft (11) as the second spur gear (10) mentioned in the description of the first sprocket (1). The shaft (11) on which these two spur gears sit is the final, uni-directional, drive shaft. This shaft (11) can be linked/connected/joined to the final drive shafts of some or all of the other linear drive converters to combine the converted energy into a single, composite drive shaft. When the sprocket (2) on the side leading to the bottom of the float rotates counter-clockwise (i.e., when the float is falling), its rachet (5) engages, driving its associated spur gear (9), and the ratchet (4) attached to the other sprocket (1) disengages, allowing its spur gear (8) to freely rotate clockwise.

Add a flat, horizontal, solid surface to the bottom of the module. Its purpose is to mitigate vertical movement of the platform module when the bobbing floats are pushed up by rising waves, or are pulled down by the force of gravity when waves recede. It is assumed that a load (resisting force), like an electrical generator, will be applied to the final drive shafts of the linear drive converters. As such, when vertical forces are applied to the bobbing floats, they will resist movement (with respect to the platform), thereby moving the platform rather than the floats with respect to the platform. (Energy can only be converted when there is movement between the floats and the platform.) Therefore, the flat surface at the bottom of the platform module is necessary. The ratio of surface areas between this bottom surface and that of the bobbing floats is roughly 40:1. As such, for every forty units the floats move, the platform module will move one unit, thereby reducing (by one fortieth) the efficiency of the device. Optimally, the platform modules can be connected (strung) together in a long, linear row—the preferred embodiment of the platform. Doing so, effectively obviates the need for the flat surface along the bottom, since while the floats of some modules will be rising, those of others will be falling—negating any vertical platform movement. However, having the bottom surface would reduce stresses along the length of the platform. Although the preferred embodiment is a linear row of connected modules, the modules can be combined to form virtually any shape.

Figure 12:
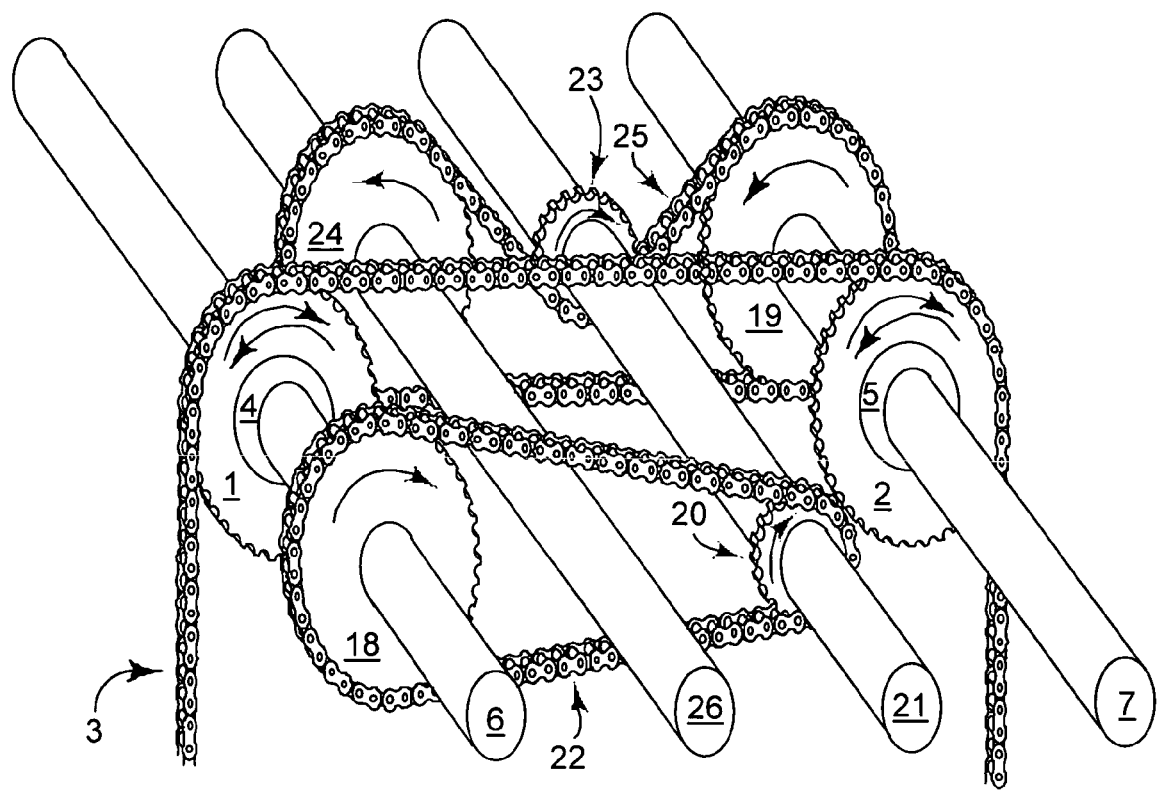
FIG. 12 is a 3-D rendering of an alternate implementation of the internal workings of the linear drive converter(s).

An alternate implementation for the linear drive converter(s) (shown in FIG. 9 and which change bi-directional, linear motion to unidirectional, rotary motion) is shown in FIG. 12. The converters contain two opposing sprockets (1 and 2) with a chain (3) running in series over them. Each sprocket is coupled with a ratchet (4 and 5 respectively) which, in turn, is mounted on a shaft (6 and 7 respectively). Mounted on each of these shafts is a sprocket (18 and 19 respectively). When the sprocket (1) on the side leading to the top of the float rotates clockwise (i.e., when the float is rising), its ratchet (4) engages and turns the sprocket (18), also mounted on shaft 6, in the same direction. This sprocket drives another sprocket (20) on another shaft (21) via a chain (22), which rotates in the same (clockwise) direction. During this time the opposing sprocket (2), on the side leading to the bottom of the float, also rotates clockwise, but its ratchet (5) disengages and spins freely in the counterclockwise direction. This ratchet is connected to a another sprocket (19) via a shaft (7) which turns in lockstep with the rotation of the ratchet. This sprocket (19) drives two other sprockets (23 and 24) via a chain (25), each on other shafts (21 and 26 respectively). The serpentine path of the chain (25) causes the shaft (21) and the sprocket (23) to rotate in the opposite direction to the shafts (7 and 26) and their respective sprockets (19 and 24). The shaft (21) on which sprockets 20 and 23 sit is the final, unidirectional, drive shaft. This shaft (21) can be linked/connected/joined to the final drive shafts of some or all of the other linear drive converters to combine the converted energy into a single, composite drive shaft. When the sprocket (2) on the side leading to the bottom of the float rotates counterclockwise (i.e., when the float is falling), its rachet (5) engages, driving its associated sprocket (19), and the ratchet (4) attached to the opposing sprocket (1) disengages, allowing its associated sprocket (18) to freely rotate clockwise.

Figure 13:
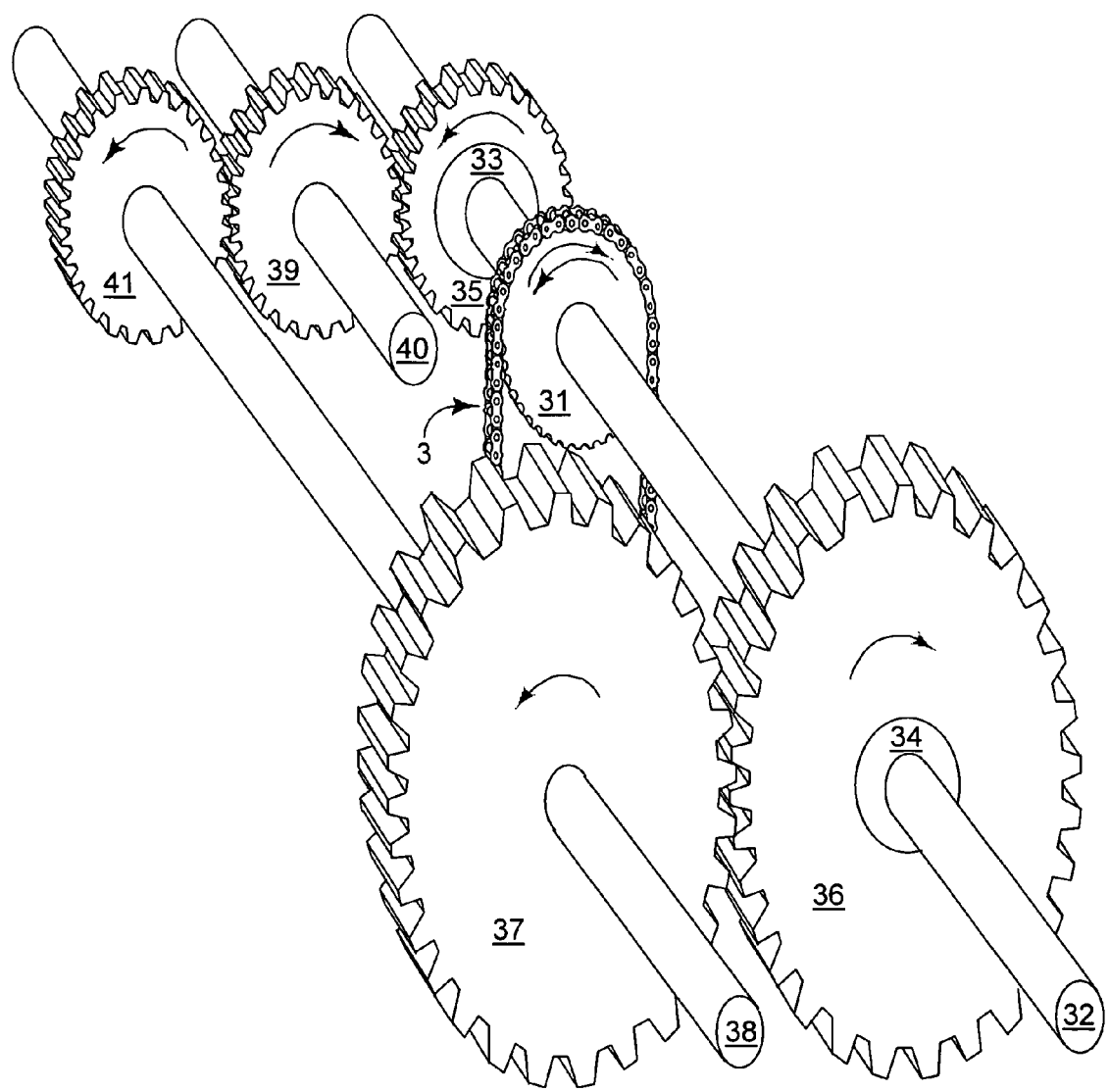
FIG. 13 is a 3-D rendering of another alternate implementation of the internal workings of the linear drive converter(s).

Another alternate implementation for the linear drive converter(s) (shown in FIG. 9 and which change bidirectional, linear motion to uni-directional, rotary motion) is shown in FIG. 13. The converter contains a sprocket (31) with a chain (3) running over it. The sprocket is mounted on a shaft (32), on which are also mounted two opposing ratchets (33 and 34). Spur gears (35 and 36) are connected to (and alternately driven by) these ratchets. When the bobbing float (16) rises, the connected chain (3) causes the sprocket (31) and the shaft (32) to rotate clockwise, and the ratchet (34) to engage, thus causing the spur gear (36) to also rotate clockwise. This spur gear (36) is meshed with another spur gear (37), mounted on a shaft (38) which rotates counterclockwise. Meanwhile, the opposing ratchet (33) disengages from its connected spur gear (35). When the bobbing float (16) falls, the connected chain (3) causes the sprocket (31) and the shaft (32) to rotate counterclockwise, and the ratchet (33) to engage thus causing the spur gear (35) to also rotate counterclockwise. This spur gear (35) is meshed with another spur gear (39), mounted on a shaft (40) which rotates clockwise. Meanwhile, the opposing ratchet (34) disengages from its connected spur gear (36). This spur gear (39) is also meshed with another spur gear (41), mounted on shaft (38). This shaft (38) is the final output drive shaft, and always rotates counterclockwise.

Figure 14:
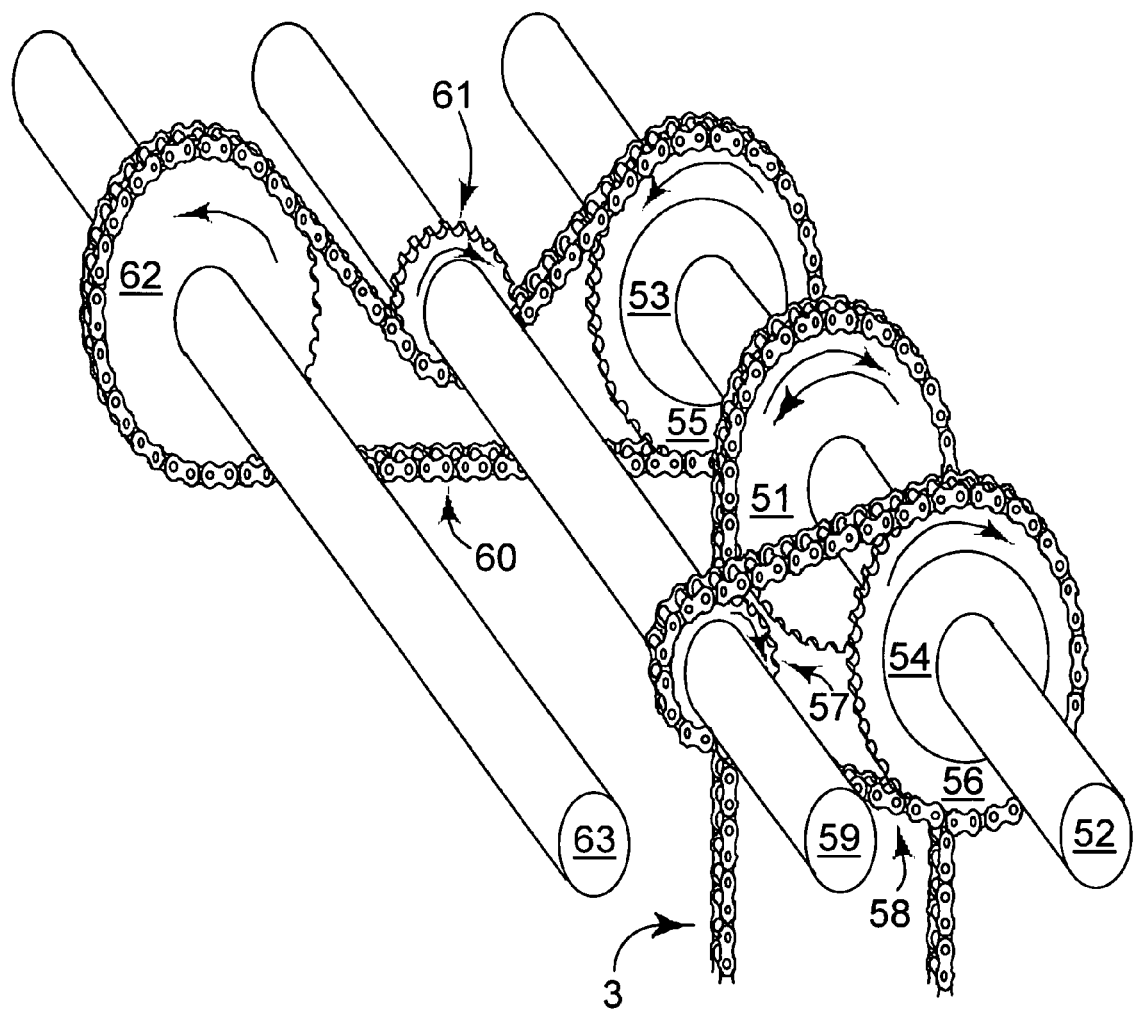
FIG. 14 is a 3-D rendering of yet another alternate implementation of the internal workings of the linear drive converter(s).

Yet another alternate implementation for the linear drive converter(s) (shown in FIG. 9 and which change bidirectional, linear motion to uni-directional, rotary motion) is shown in FIG. 14. The converter contains a sprocket (51) with a chain (3) running over it. The sprocket is mounted on a shaft (52), on which are also mounted two opposing ratchets (53 and 54). Other sprockets (55 and 56) are connected to (and alternately driven by) these ratchets. When the bobbing float (16) rises, the connected chain (3) causes the sprocket (51) and the shaft (52) to rotate clockwise, and the ratchet (54) to engage, thus causing the sprocket (56) to also rotate clockwise. This sprocket (56) is connected to another sprocket (57), via a chain (58), mounted on a shaft (59) which also rotates clockwise. Meanwhile, the opposing ratchet (53) disengages from its connected sprocket (55). When the bobbing float (16) falls, the connected chain (3) causes the sprocket (51) and the shaft (52) to rotate counterclockwise, and the ratchet (53) to engage thus causing the sprocket (55) to also rotate counterclockwise. This sprocket (55) drives a chain (60) which runs over two other sprockets (61 and 62) which are mounted on two other shafts (59 and 63 respectively). The serpentine path of the chain (60) over the sprockets (55, 61 and 62) is such that the sprocket (61) rotates in the opposite direction from that of the other sprockets (55 and 62), and causes the shaft (59) to rotate clockwise. Meanwhile, the opposing ratchet (54) disengages from its connected sprocket (56). This shaft (59) is the final output drive shaft, and always rotates clockwise.

What is claimed is:
1. A floating platform, comprising:
  a plurality of interconnected tetrahedrons; a plurality of isolated stabilization floats;
  a plurality of bobbing floats, which move vertically when and acted upon by ocean waves and swells;
  and a plurality of linear drive converters which convert the vertical motions of said bobbing floats into unidirectional rotary motion;

wherein said interconnecting tetrahedrons and said plurality of isolated stabilization floats are arranged to surround said bobbing floats;
wherein said isolated stabilization floats comprise linear conduits formed by adjacent vertical surfaces made of a rigid, water impermeable material, hollow and open on both ends, attached to the tetrahedral platform at each module junction point, and containing buoyant members affixed to their interiors.

2. The floating platform as recited in claim 1, further comprising a plurality of modules formed by said interconnected tetrahedrons, isolated stabilization floats, and linear drive converters;
wherein each module is attached to the side of another module to form the shape of the platform, each module comprising:
a plurality of units, wherein each unit is stacked on and attached to the top of another unit, each unit comprising:
a plurality of layers, wherein each layer is inverted, stacked on, and attached to the top of another layer, each layer comprising:
a plurality of tetrahedrons, wherein the bases of said tetrahedrons are placed on a flat plane and arranged such that two vertices of each base come in contact with and are connected to a base vertex of each of two other tetrahedrons, thereby forming an equilateral triangular base, wherein the sides of said triangular base is twice the length of the individual tetrahedron sides, and connecting the upper peaks of said tetrahedrons with three members identical in length to those with which the tetrahedrons are formed.

3. The floating platform as recited in claim 1, wherein said linear drive converters further comprise: a first sprocket operably connected to a clockwise engaging first ratchet mounted on and fixed in rotation with a first shaft;
a first spur gear also mounted on and fixed in rotation with said first shaft;
a second spur gear meshed with said first spur gear and mounted on and fixed in rotation with a second shaft;
a second sprocket operably connected to a counter-clockwise engaging second ratchet mounted on and fixed in rotation with a third shaft;
a third spur gear also mounted on and fixed in rotation with said third shaft;
a fourth spur gear meshed with said third spur gear and mounted on and fixed in rotation with a fourth shaft;
a fifth spur gear mounted on and fixed in rotation with said second shaft and meshed with said fourth spur gear, the length of said second shaft being extended in order to provide connectablility to its uni-directional rotational motion;
a chain connected to a bobbing float and running in series over said first sprocket and said second sprocket.

4. The floating platform as recited in claim 1, wherein said linear drive converters further comprise:
a first spur gear operably connected to a clockwise engaging first ratchet mounted on and fixed in rotation with a first shaft;
a second spur gear also mounted on and fixed in rotation with said first shaft;
a third spur gear meshed with said second spur gear and mounted on and fixed in rotation with a second shaft;
a fourth spur gear operably connected to a counter-clockwise engaging second ratchet mounted on and fixed in rotation with a third shaft;
a fifth spur gear also mounted on and fixed in rotation with said third shaft;
a sixth spur gear meshed with said fifth spur gear and mounted on and fixed in rotation with a fourth shaft;
a seventh spur gear mounted on and fixed in rotation with said second shaft and meshed with said sixth spur gear, the length of said second shaft being extended, providing connectablility to its uni-directional rotational motion;
a laterally groove belt connected to a bobbing float and running in series over said first spur gear and said fourth spur gear.

5. The floating platform as recited in claim 1, wherein said linear drive converters further comprise:
a first sprocket operably connected to a clockwise engaging first ratchet mounted on and fixed in rotation with a first shaft;
a second sprocket also mounted on and fixed in rotation with said first shaft;
a third sprocket linked to said second sprocket via a first closed loop drive chain and mounted on and fixed in rotation with a second shaft;
a fourth sprocket operably connected to a counter-clockwise engaging second ratchet mounted on and fixed in rotation with a third shaft;
a fifth sprocket also mounted on and fixed in rotation with said third shaft;
a sixth sprocket mounted on and fixed in rotation with a fourth shaft;
a seventh sprocket inversely linked to said fifth sprocket and said sixth sprocket via a second closed loop drive chain and mounted on and fixed in rotation with said second shaft, the length of said second shaft being extended, providing connectability to its uni-directional rotational motion;
a third chain connected to a bobbing float and running in series over said first sprocket and said fourth sprocket.

6. The floating platform as recited in claim 1, wherein said linear drive converters further comprise:
a first spur gear operably connected to a clockwise engaging first ratchet mounted on and fixed in rotation with a first shaft;
a first sprocket also mounted on and fixed in rotation with said first shaft;
a second sprocket linked to said first sprocket via a first closed loop drive chain and mounted on and fixed in rotation with a second shaft;
a second spur gear operably connected to a counter-clockwise engaging second ratchet mounted on and fixed in rotation with a third shaft;
a third sprocket also mounted on and fixed in rotation with said third shaft;
a fourth sprocket mounted on and fixed in rotation with a fourth shaft;
a fifth sprocket inversely linked to said third sprocket and said fourth sprocket via a second closed loop drive chain and mounted on and fixed in rotation with said second shaft, the length of said second shaft being extended, providing connectability to its uni-directional rotational motion;
a laterally grooved belt connected to a bobbing float and running in series over said first spur gear and said second spur gear.

7. The floating platform as recited in claim 1, wherein said linear drive converters further comprise:
a sprocket mounted on and fixed in rotation with a first shaft;
a first clockwise engaging ratchet mounted on and fixed in rotation with said first shaft;

a first spur gear operably connected to said first ratchet;
a second spur gear mounted on and fixed in rotation with a second shaft and meshed with said first spur gear;
a second counter-clockwise engaging ratchet mounted on and fixed in rotation with said first shaft;
a third spur gear operably connected to said second ratchet;
a fourth spur gear meshed with said third spur gear and mounted on and fixed in rotation with a third shaft;
a fifth spur gear mounted on and fixed in rotation with said second shaft and meshed with said fourth spur gear,
and a chain connected to a bobbing float and running over said sprocket.

8. The floating platform as recited in claim 1, wherein said linear drive converters further comprise:
a first spur gear mounted on and fixed in rotation with a first shaft;
a first clockwise engaging ratchet mounted on and fixed in rotation with said first shaft;
a second spur gear operably connected to said first ratchet;
a third spur gear mounted on and fixed in rotation with a second shaft and meshed with said first spur gear;
a second counter-clockwise engaging ratchet mounted on and fixed in rotation with said first shaft;
a fourth spur gear operably connected to said second ratchet;
a fifth spur gear meshed with said third spur gear and mounted on and fixed in rotation with a third shaft;
a sixth spur gear mounted on and fixed in rotation with said second shaft and meshed with said fifth spur gear, the length of said second shaft being extended in order to provide connectablility to its uni-directional rotational motion;
a laterally grooved belt connected to a bobbing float and running over said first spur gear.

9. The floating platform as recited in claim 1, wherein said linear drive converters further comprise:
a first sprocket mounted on and fixed in rotation with a first shaft;
a first clockwise engaging ratchet mounted on and fixed in rotation with said first shaft;
a second sprocket operably connected to said first ratchet;
a third sprocket linked to said second sprocket via a second closed loop drive chain, and mounted on and fixed in rotation with a second shaft;
a second counter-clockwise engaging ratchet mounted on and fixed in rotation with said first shaft;
a fourth sprocket operably connected to said second ratchet;
a fifth sprocket mounted on and fixed in rotation with a third shaft;
a sixth sprocket inversely linked to said fourth sprocket and said fifth sprocket via a second closed loop drive chain, and mounted on and fixed in rotation with said second shaft, the length of said second shaft being extended, providing connectability to its uni-directional rotational motion;
a chain connected to a bobbing float and running over said first sprocket.

10. The floating platform as recited in claim 1, wherein said linear drive converters further comprise:
a spur gear mounted on and fixed in rotation with a first shaft;
a first clockwise engaging ratchet mounted on and fixed in rotation with said first shaft;
a first sprocket operably connected to said first ratchet;
a second sprocket linked to said first sprocket via a first closed loop drive chain, and mounted on and fixed in rotation with a second shaft;
a second counter-clockwise engaging ratchet mounted on and fixed in rotation with said first shaft;
a third sprocket operably connected to said second ratchet;
a fourth sprocket mounted on and fixed in rotation with a third shaft;
a fifth sprocket inversely linked to said third sprocket and said fourth sprocket via a second closed loop drive chain, and mounted on and fixed in rotation with said second shaft, the length of said second shaft being extended, providing connectability to its uni-directional rotational motion;
a laterally grooved belt connected to a bobbing float and running over said spur gear.

* * * * *